US012632311B2

(12) United States Patent
Choksi et al.

(10) Patent No.: US 12,632,311 B2
(45) Date of Patent: May 19, 2026

(54) INFRASTRUCTURE AS CODE DEPLOYMENT MECHANISM

(71) Applicant: Intel Corporation, Santa Clara, CA (US)

(72) Inventors: Alpa Choksi, Portland, OR (US); Patrick Koeberl, Alsbach-Hähnlein (DE); Steffen Schulz, Darmstadt (DE); Reshma Lal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 816 days.

(21) Appl. No.: 17/560,652

(22) Filed: Dec. 23, 2021

(65) Prior Publication Data

US 2022/0114023 A1    Apr. 14, 2022

(51) Int. Cl.
G06F 9/50 (2006.01)
G06F 9/4401 (2018.01)

(52) U.S. Cl.
CPC ............ G06F 9/505 (2013.01); G06F 9/4411 (2013.01); G06F 9/5072 (2013.01); G06F 9/5077 (2013.01)

(58) Field of Classification Search
CPC ........ G06F 9/50; G06F 9/5005; G06F 9/5011; G06F 9/5016; G06F 9/5022; G06F 9/5027; G06F 9/5044; G06F 9/5055; G06F 9/5077
See application file for complete search history.

(56) References Cited

U.S. PATENT DOCUMENTS

| | | | | |
|---|---|---|---|---|
| 11,010,191 | B1 * | 5/2021 | Hornbeck ............. | H04L 67/133 |
| 11,074,165 | B2 * | 7/2021 | Khakare .................. | G06F 8/61 |
| 11,367,140 | B2 * | 6/2022 | Mehedy ............. | H04L 63/1433 |
| 11,392,419 | B2 * | 7/2022 | Sridharan ............ | H04L 63/061 |
| 12,026,082 | B2 * | 7/2024 | Chivukula ........... | G06F 21/577 |
| 12,063,217 | B2 * | 8/2024 | Shivanna ............... | H04L 63/20 |
| 2022/0300340 | A1 * | 9/2022 | Cardenas ............... | G06F 9/505 |
| 2023/0052827 | A1 * | 2/2023 | Araujo ................. | G06F 9/4881 |
| 2023/0069334 | A1 * | 3/2023 | Reznik .................. | G06F 21/568 |

* cited by examiner

*Primary Examiner* — Andy Ho
(74) *Attorney, Agent, or Firm* — JAFFERY WATSON HAMILTON & DESANCTIS LLP

(57) ABSTRACT

A computing platform comprising a plurality of disaggregated data center resources and an infrastructure processing unit (IPU), communicatively coupled to the plurality of resources, to compose a platform of the plurality of disaggregated data center resources for allocation of microservices cluster.

17 Claims, 8 Drawing Sheets

INFRASTRUCTURE AS CODE DEPLOYMENT MECHANISM

BACKGROUND

Infrastructure as Code (IaC) is a code-based approach that describes configurations for provisioning infrastructure resources within a cloud environment using machine-readable definition files. Cloud environments operated via IaC typically include software containers, microservices, Kubernetes, device hardware resources etc. Although Cloud Service Providers (CSPs) that provide cloud environments are currently trusted, cloud customers that are becoming less willing to fully trust a CSP that has no existing mechanisms to provide security assurances against malicious CSP-backdoors or configuration drifts from the requested infrastructure configuration.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
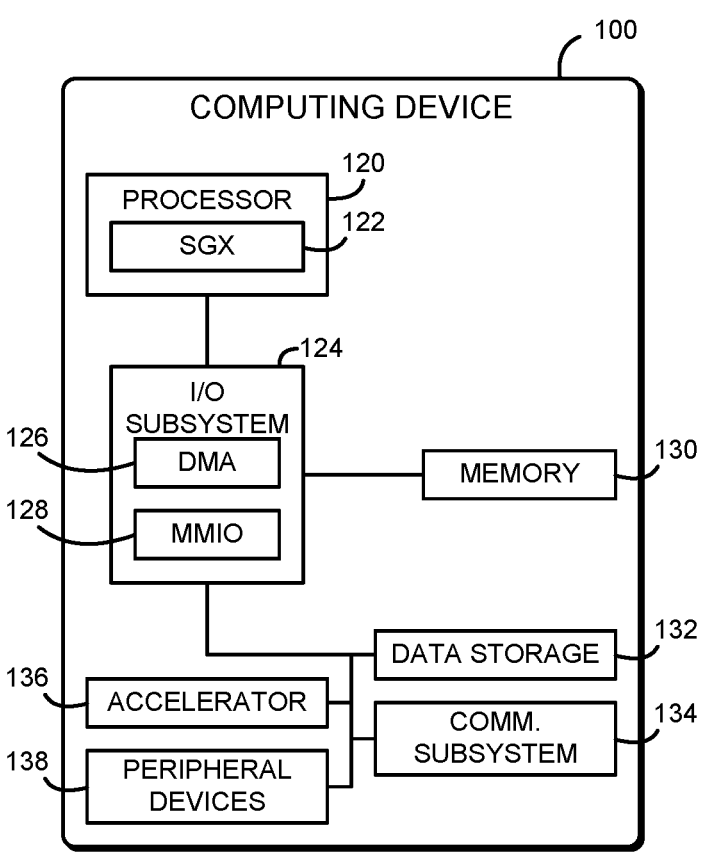
FIG. 1 is a simplified block diagram of at least one embodiment of a computing device for secure I/O with an accelerator device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for secure I/O with an accelerator device includes a processor 120 and an accelerator device 136, such as a field-programmable gate array (FPGA). In use, as described further below, a trusted execution environment (TEE) established by the processor 120 securely communicates data with the accelerator 136. Data may be transferred using memory-mapped I/O (MMIO) transactions or direct memory access (DMA) transactions. For example, the TEE may perform an MMIO write transaction that includes encrypted data, and the accelerator 136 decrypts the data and performs the write. As another example, the TEE may perform an MMIO read request transaction, and the accelerator 136 may read the requested data, encrypt the data, and perform an MMIO read response transaction that includes the encrypted data. As yet another example, the TEE may configure the accelerator 136 to perform a DMA operation, and the accelerator 136 performs a memory transfer, performs a cryptographic operation (i.e., encryption or decryption), and forwards the result. As described further below, the TEE and the accelerator 136 generate authentication tags (ATs) for the transferred data and may use those ATs to validate the transactions. The computing device 100 may thus keep untrusted software of the computing device 100, such as the operating system or virtual machine monitor, outside of the trusted code base (TCB) of the TEE and the accelerator 136. Thus, the computing device 100 may secure data exchanged or otherwise processed by a TEE and an accelerator 136 from an owner of the computing device 100 (e.g., a cloud service provider) or other tenants of the computing device 100. Accordingly, the computing device 100 may improve security and performance for multi-tenant environments by allowing secure use of accelerator devices.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 124, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As shown, the memory 130 may be communicatively coupled to the processor 120 via the I/O subsystem 124, which may be embodied as circuitry and/or components to facilitate input/output operations with the processor 120, the memory 130, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 130, the accelerator device 136, and/or other components of the computing device 100, on a single integrated circuit chip. Additionally, or alternatively, in some embodiments the processor 120 may include an integrated memory controller and a system agent, which may be embodied as a logic block in which data traffic from processor cores and I/O devices converges before being sent to the memory 130.

As shown, the I/O subsystem 124 includes a direct memory access (DMA) engine 126 and a memory-mapped I/O (MMIO) engine 128. The processor 120, including secure enclaves established with the secure enclave support 122, may communicate with the accelerator device 136 with one or more DMA transactions using the DMA engine 126 and/or with one or more MMIO transactions using the MMIO engine 128. The computing device 100 may include multiple DMA engines 126 and/or MMIO engines 128 for handling DMA and MMIO read/write transactions based on bandwidth between the processor 120 and the accelerator 136. Although illustrated as being included in the I/O subsystem 124, it should be understood that in some embodiments the DMA engine 126 and/or the MMIO engine 128 may be included in other components of the computing device 100 (e.g., the processor 120, memory controller, or system agent), or in some embodiments may be embodied as separate components.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator device 136 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions), GPUs, etc. Illustratively, the accelerator device 136 is an FPGA, which may be embodied as an integrated circuit including programmable digital logic resources that may be configured after manufacture. The FPGA may include, for example, a configurable array of logic blocks in communication over a configurable data interchange. The accelerator device 136 may be coupled to the processor 120 via a high-speed connection interface such as a peripheral bus (e.g., a PCI Express bus) or an inter-processor interconnect (e.g., an in-die interconnect (IDI) or QuickPath Interconnect (QPI)), or via any other appropriate interconnect. The accelerator device 136 may receive data and/or commands for processing from the processor 120 and return results data to the processor 120 via DMA, MMIO, or other data transfer transactions.

As shown, the computing device 100 may further include one or more peripheral devices 138. The peripheral devices 138 may include any number of additional input/output devices, interface devices, hardware accelerators, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 2:
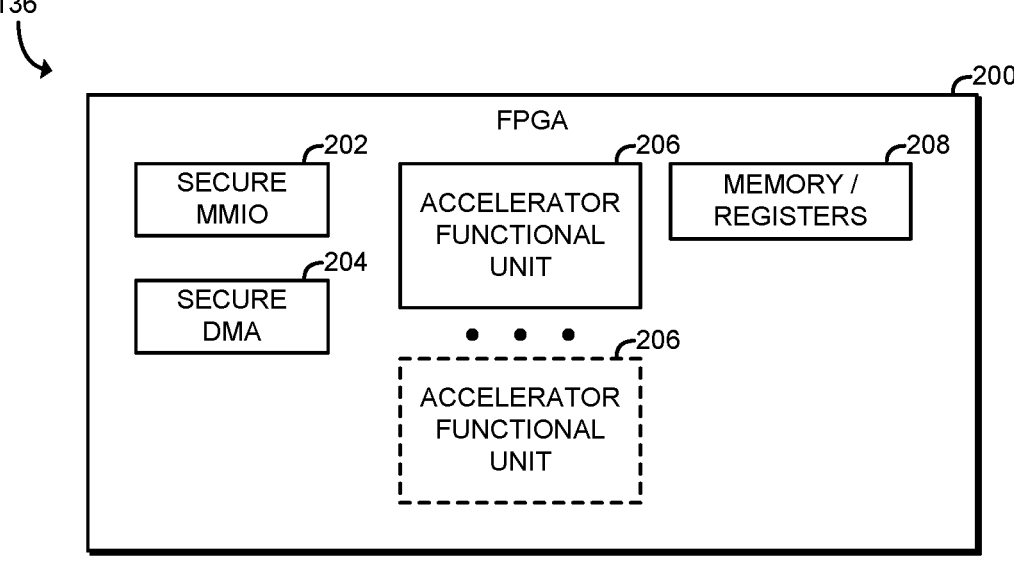
FIG. 2 is a simplified block diagram of at least one embodiment of an accelerator device of the computing device of FIG. 1.

Referring now to FIG. 2, an illustrative embodiment of a field-programmable gate array (FPGA) 200 is shown. As shown, the FPGA 200 is one potential embodiment of an accelerator device 136. The illustratively FPGA 200 includes a secure MMIO engine 202, a secure DMA engine 204, one or more accelerator functional units (AFUs) 206, and memory/registers 208. As described further below, the secure MMIO engine 202 and the secure DMA engine 204 perform in-line authenticated cryptographic operations on data transferred between the processor 120 (e.g., a secure enclave established by the processor) and the FPGA 200 (e.g., one or more AFUs 206). In some embodiments, the secure MMIO engine 202 and/or the secure DMA engine 204 may intercept, filter, or otherwise process data traffic on one or more cache-coherent interconnects, internal buses, or other interconnects of the FPGA 200.

Each AFU 206 may be embodied as logic resources of the FPGA 200 that are configured to perform an acceleration task. Each AFU 206 may be associated with an application executed by the computing device 100 in a secure enclave or other trusted execution environment. Each AFU 206 may be configured or otherwise supplied by a tenant or other user of the computing device 100. For example, each AFU 206 may correspond to a bitstream image programmed to the FPGA 200. As described further below, data processed by each AFU 206, including data exchanged with the trusted execution environment, may be cryptographically protected from untrusted components of the computing device 100 (e.g., protected from software outside of the trusted code base of the tenant enclave). Each AFU 206 may access or otherwise process stored in the memory/registers 208, which may be embodied as internal registers, cache, SRAM, storage, or other memory of the FPGA 200. In some embodiments, the memory 208 may also include external DRAM or other dedicated memory coupled to the FPGA 200.

Figure 3:
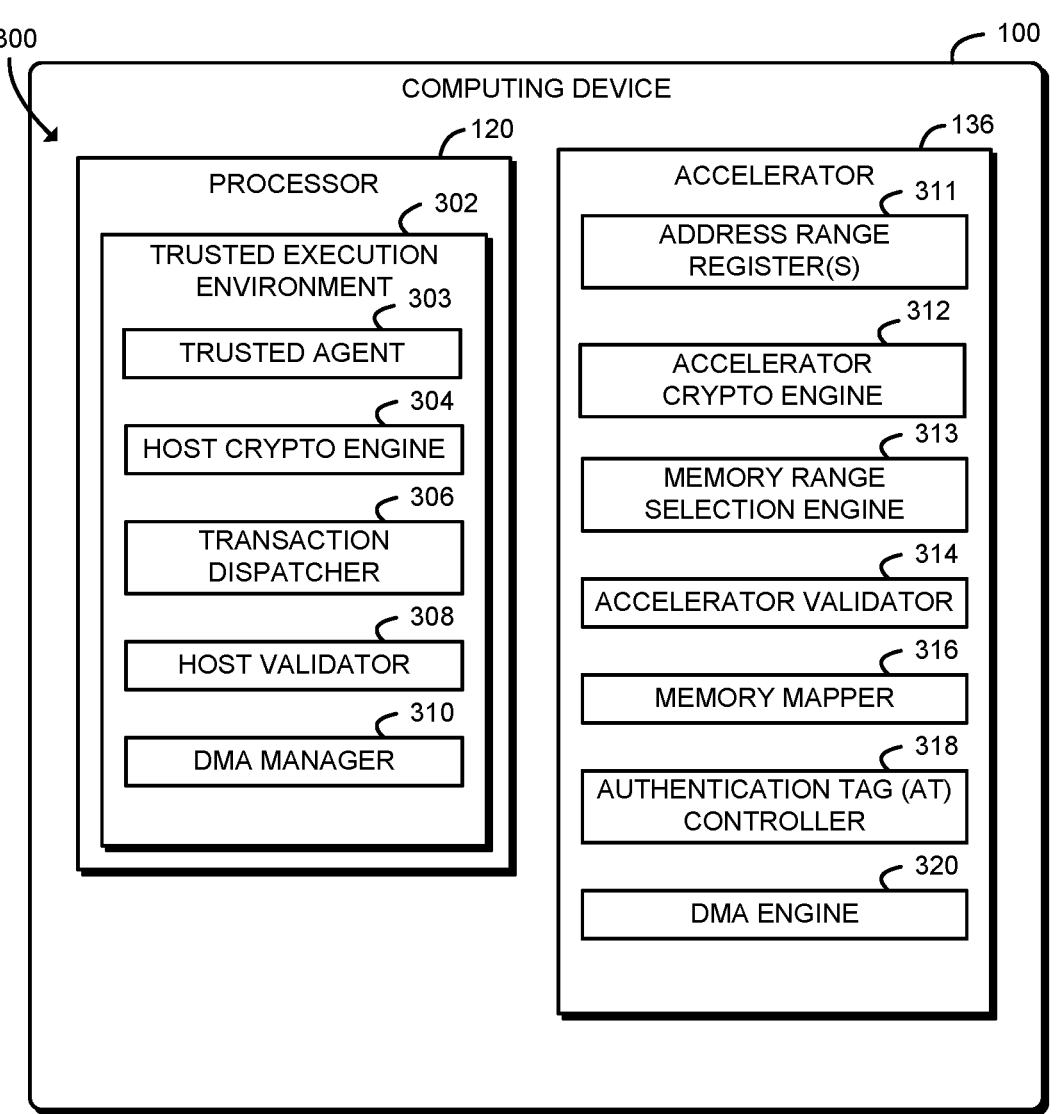
FIG. 3 is a simplified block diagram of at least one embodiment of an environment of the computing device of FIGS. 1 and 2.

Referring now to FIG. 3, in an illustrative embodiment, the computing device 100 establishes an environment 300 during operation. The illustrative environment 300 includes a trusted execution environment (TEE) 302 and the accelerator 136. The TEE 302 further includes a host cryptographic engine 304, a transaction dispatcher 306, a host validator 308, and a direct memory access (DMA) manager 310. The accelerator 136 includes an accelerator cryptographic engine 312, an accelerator validator 314, a memory mapper 316, an authentication tag (AT) controller 318, and a DMA engine 320. The various components of the environment 300 may be embodied as hardware, firmware, software, or a combination thereof. As such, in some embodiments, one or more of the components of the environment 300 may be embodied as circuitry or collection of electrical devices (e.g., host cryptographic engine circuitry 304, transaction dispatcher circuitry 306, host validator circuitry 308, DMA manager circuitry 310, accelerator cryptographic engine circuitry 312, accelerator validator circuitry 314, memory mapper circuitry 316, AT controller circuitry 318, and/or DMA engine circuitry 320). It should be appreciated that, in such embodiments, one or more of the host cryptographic engine circuitry 304, the transaction dispatcher circuitry 306, the host validator circuitry 308, the DMA manager circuitry 310, the accelerator cryptographic engine circuitry 312, the accelerator validator circuitry 314, the memory mapper circuitry 316, the AT controller circuitry 318, and/or the DMA engine circuitry 320 may form a portion of the processor 120, the I/O subsystem 124, the accelerator 136, and/or other components of the computing device 100. Additionally, in some embodiments, one or more of the illustrative components may form a portion of another component and/or one or more of the illustrative components may be independent of one another.

The TEE 302 may be embodied as a trusted execution environment of the computing device 100 that is authenticated and protected from unauthorized access using hardware support of the computing device 100, such as the secure enclave support 122 of the processor 120. Illustratively, the TEE 302 may be embodied as one or more secure enclaves established using Intel SGX technology. The TEE 302 may also include or otherwise interface with one or more drivers, libraries, or other components of the computing device 100 to interface with the accelerator 136.

The host cryptographic engine 304 is configured to generate an authentication tag (AT) based on a memory-mapped I/O (MMIO) transaction and to write that AT to an AT register of the accelerator 136. For an MMIO write request, the host cryptographic engine 304 is further configured to encrypt a data item to generate an encrypted data item, and the AT is generated in response to encrypting the data item. For an MMIO read request, the AT is generated based on an address associated with MMIO read request.

The transaction dispatcher 306 is configured to dispatch the memory-mapped I/O transaction (e.g., an MMIO write request or an MMIO read request) to the accelerator 136 after writing the calculated AT to the AT register. An MMIO write request may be dispatched with the encrypted data item.

The host validator 308 may be configured to verify that an MMIO write request succeeded in response dispatching the MMIO write request. Verifying that the MMIO write request succeeded may include securely reading a status register of the accelerator 136, securely reading a value at the address of the MMIO write from the accelerator 136, or reading an AT register of the accelerator 136 that returns an AT value calculated by the accelerator 136, as described below. For MMIO read requests, the host validator 308 may be further configured to generate an AT based on an encrypted data item included in a MMIO read response dispatched from the accelerator 136; read a reported AT from a register of the accelerator 136; and determine whether the AT generated by the TEE 302 matches the AT reported by the accelerator 136. The host validator 308 may be further configured to indicate an error if those ATs do not match, which provides assurance that data was not modified on the way from the TEE 302 to the accelerator 136.

The accelerator cryptographic engine 312 is configured to perform a cryptographic operation associated with the MMIO transaction and to generate an AT based on the MMIO transaction in response to the MMIO transaction being dispatched. For an MMIO write request, the cryptographic operation includes decrypting an encrypted data item received from the TEE 302 to generate a data item, and the AT is generated based on the encrypted data item. For an MMIO read request, the cryptographic operation includes encrypting a data item from a memory of the accelerator 136 to generate an encrypted data item, and the AT is generated based on that encrypted data item.

The accelerator validator 314 is configured to determine whether the AT written by the TEE 302 matches the AT determined by the accelerator 136. The accelerator validator 314 is further configured to drop the MMIO transaction if those ATs do not match. For MMIO read requests, the accelerator validator 314 may be configured to generate a poisoned AT in response to dropping the MMIO read request, and may be further configured to dispatch a MMIO read response with a poisoned data item to the TEE 302 in response to dropping the MMIO read request.

The memory mapper 316 is configured to commit the MMIO transaction in response to determining that the AT written by the TEE 302 matches the AT generated by the accelerator 136. For an MMIO write request, committing the transaction may include storing the data item in a memory of the accelerator 136. The memory mapper 316 may be further configured to set a status register to indicate success in response to storing the data item. For an MMIO read request, committing the transaction may include reading the data item at the address in the memory of the accelerator 136 and dispatching an MMIO read response with the encrypted data item to the TEE 302.

The DMA manager 310 is configured to securely write an initialization command to the accelerator 136 to initialize a secure DMA transfer. The DMA manager 310 is further configured to securely configure a descriptor indicative of a host memory buffer, an accelerator 136 buffer, and a transfer direction. The transfer direction may be host to accelerator 136 or accelerator 136 to host. The DMA manager 310 is further configured to securely write a finalization command to the accelerator 136 to finalize an authentication tag (AT) for the secure DMA transfer. The initialization command, the descriptor, and the finalization command may each be securely written and/or configured with an MMIO write request. The DMA manager 310 may be further configured to determine whether to transfer additional data in response to securely configuring the descriptor, the finalization command may be securely written in response to determining that no additional data remains for transfer.

The AT controller 318 is configured to initialize an AT in response to the initialization command from the TEE 302. The AT controller 318 is further configured to finalize the AT in response to the finalization command from the TEE 302.

The DMA engine 320 is configured to transfer data between the host memory buffer and the accelerator 136 buffer in response to the descriptor from the TEE 302. For a transfer from host to accelerator 136, transferring the data includes copying encrypted data from the host memory buffer and forwarding the plaintext data to the accelerator 136 buffer in response to decrypting the encrypted data. For a transfer from accelerator 136 to host, transferring the data includes copying plaintext data from the accelerator 136 buffer and forwarding encrypted data to the host memory buffer in response encrypting the plaintext data.

The accelerator cryptographic engine 312 is configured to perform a cryptographic operation with the data in response to transferring the data and to update the AT in response to transferring the data. For a transfer from host to accelerator 136, performing the cryptographic operation includes decrypting encrypted data to generate plaintext data. For a transfer from accelerator 136 to host, performing the cryptographic operation includes encrypting plaintext data to generate encrypted data.

The host validator 308 is configured to determine an expected AT based on the secure DMA transfer, to read the AT from the accelerator 136 in response to securely writing the finalization command, and to determine whether the AT from the accelerator 136 matches the expected AT. The host validator 308 may be further configured to indicate success if the ATs match and to indicate failure if the ATs do not match.

Figure 4:
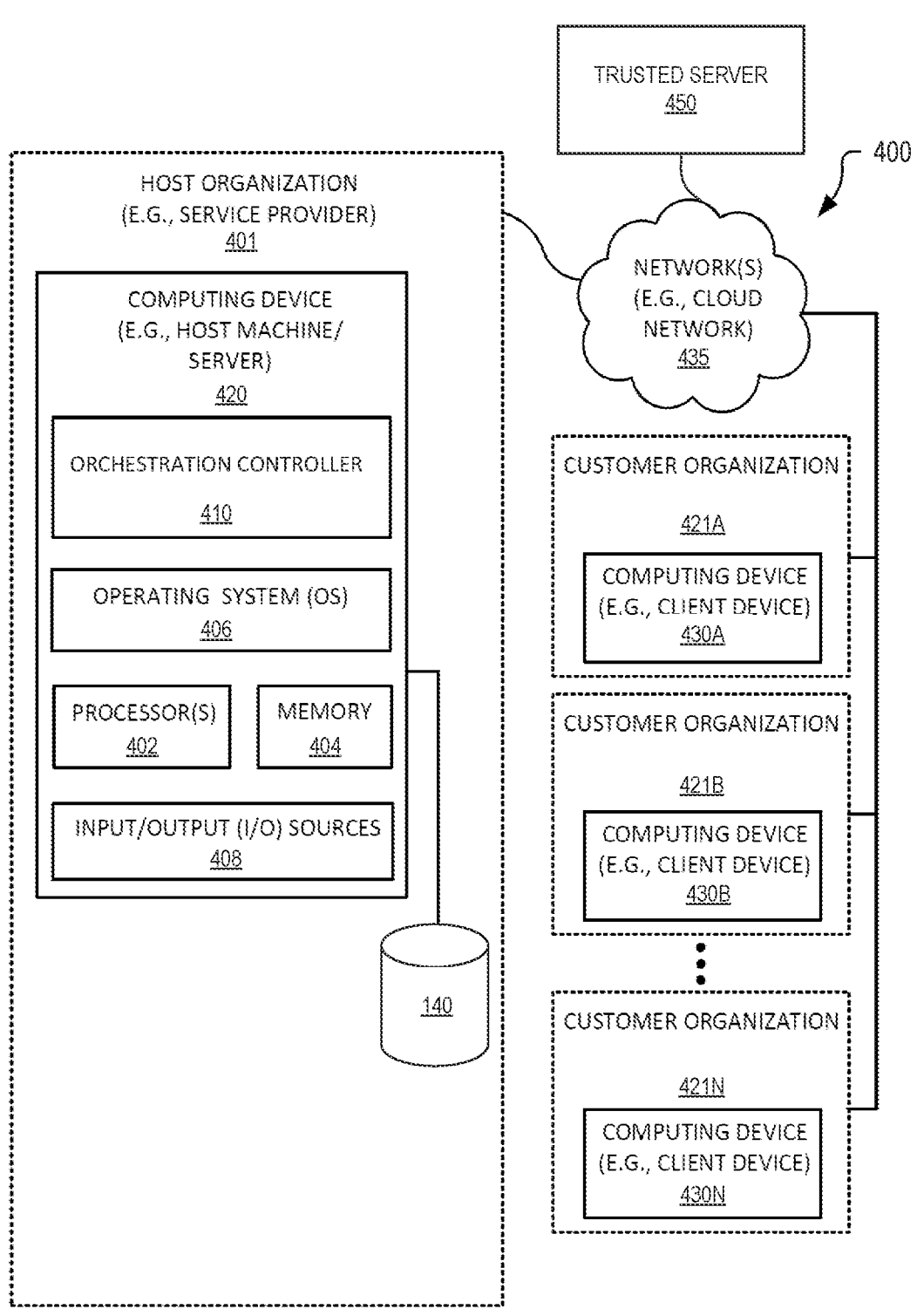
FIG. 4 illustrates one embodiment of a system.

FIG. 4 illustrates one embodiment of a system 400 having a computing device 420 employing an orchestration controller (or controller) 410. In one embodiment, orchestration enables automated deployment, configuration, coordination and management of infrastructure resources within a cloud computing environment provided by a cloud service provider (CSP). As shown in FIG. 4, computing device 420 includes a host server computer serving as a host machine for employing controller 410 to facilitate a provisioning of cluster life-cycles (e.g., public and private) accessible by customer organizations 421 via a platform as a service (PaaS) or infrastructure as a service (IaaS). Computing device 420 may include (without limitation) server computers (e.g., cloud server computers, etc.), desktop computers, cluster-based computers, set-top boxes (e.g., Internet-based cable television set-top boxes, etc.), etc. Computing device 420 includes an operating system ("OS") 406 serving as an interface between one or more hardware/physical resources of computing device 420 and one or more client devices 430A-430N, etc. Computing device 420 further includes processor(s) 402, memory 404, input/output ("I/O") sources 408, such as touchscreens, touch panels, touch pads, virtual or regular keyboards, virtual or regular mice, etc.

In one embodiment, host organization 401 may further employ a production environment that is communicably interfaced with client devices 430A-N through host organization 401. Client devices 430A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process data on behalf of customer organizations 421A-N. In some embodiments, host organization 401 receives input and other requests from a plurality of customer organizations 421A-N over one or more networks 435; for example, incoming data, or other inputs may be received from customer organizations 421A-N to be processed using database system 140.

In one embodiment, each customer organization 421A-N is an entity selected from a group consisting of a separate and distinct remote organization, an organizational group within host organization 401, a business partner of host organization 401, a customer organization 421A-N that subscribes to cloud computing services provided by host organization 401, etc.

In one embodiment, requests are received at, or submitted to, a web server within host organization 401. Host organization 401 may receive a variety of requests for processing by host organization 401. For example, incoming requests received at the web server may specify services from host organization 401 are to be provided. In one embodiment, the requests may comprise an IaC template (or manifest). Further, host organization 401 may implement a request interface via the web server or as a stand-alone interface to receive requests packets or other requests from the client devices 430A-N. The request interface may further support the return of response packets or other replies and responses in an outgoing direction from host organization 401 to one or more client devices 430A-N.

In one embodiment, computing device 420 may include a server computer that may be further in communication with one or more databases or storage repositories, such as database(s) 140, which may be located locally or remotely over one or more networks, such as network(s) 435 (e.g., cloud network, Internet, proximity network, intranet, Internet of Things ("IoT"), Cloud of Things ("CoT"), etc.).

Computing device 420 is further shown to be in communication with any number and type of other computing devices, such as client computing devices 430A-N, over one or more networks, such as network(s) 435.

In one embodiment, computing device 420 may serve as a service provider core for hosting and maintaining controller 410 as a SaaS or IaaS, and be in communication with one or more client computers 430A-N, over one or more network(s) 435, and any number and type of dedicated nodes. In such an embodiment, host organization 401 implements orchestration controller 410 to operate as a control plane during deployment and at runtime, to perform tasks such as carving out infrastructure resources needed for microservices to run and allocate the tasks to the different microservices based on their specific need or adapting to different load conditions.

Figure 5:
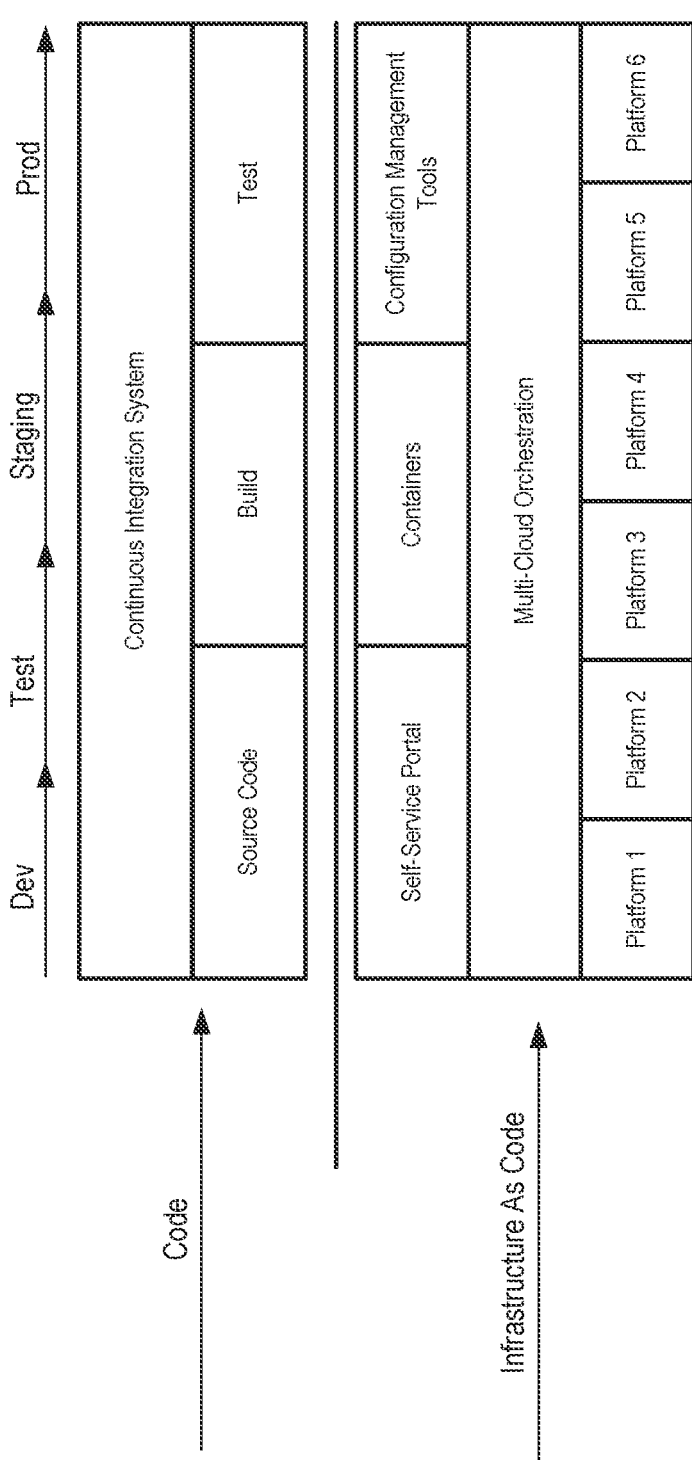
FIG. 5 illustrates an exemplary IaC cloud service configuration.

FIG. 5 illustrates an exemplary IaC platform. As shown in FIG. 5, a CSP developer defines configuration parameters for CSP-owned infrastructure resources (e.g., software stacks and hardware) in a domain-specific language (DSL) that could be requested by a cloud customer. The instruction files are transmitted to a master server and exposed via a management API, or a code repository. The IaC platform follows the developer's instructions to create and configure the infrastructure. With an IaC, cloud customers do not need to configure an environment every time they are to develop, test, or deploy software. All infrastructure parameters are saved in the form of files called IaC Templates/Manifests. As all code files, manifests are easy to reuse, edit, copy, and share. Manifests make building, testing, staging, and deploying infrastructure quicker and consistent.

An IaC is especially useful when many compute instances (or virtual machines (VMs)) need to be provisioned on a regular basis. This code might be responsible for the creation of all, or a part, of a user's environment, or only particular VMs. An IaC may also be parameterized, and able to generate code that allows for small variations. A parameter may comprise a region of deployment. Thus, when the code is executed, the script will trigger a user to select a desired parameter, and select between a region (e.g., West Europe or East Europe). Most CSP platforms support IaC that includes tools to manage all aspects of a cloud server installation within the frameworks of the CSP platforms.

Figure 6:
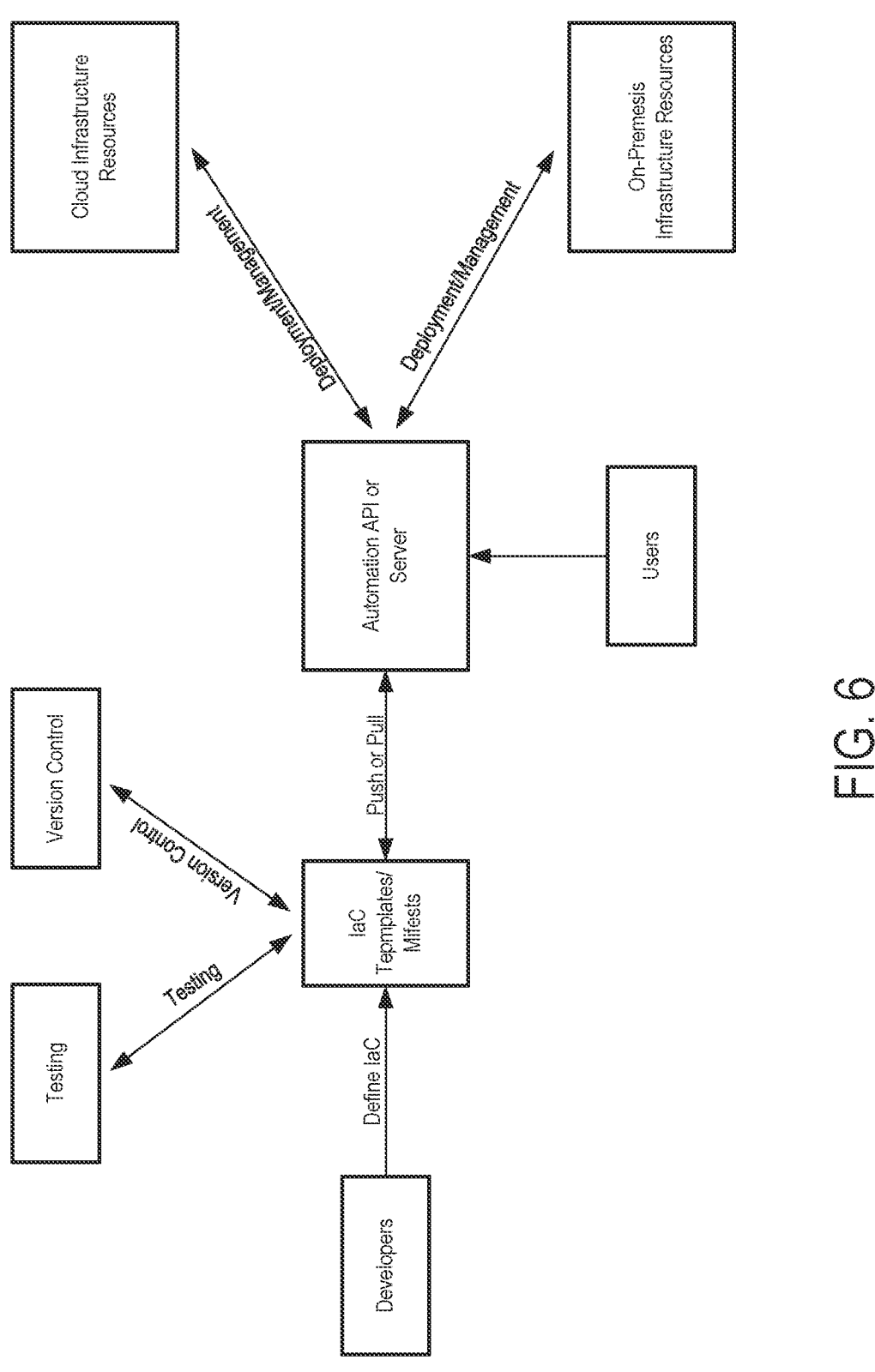
FIG. 6 illustrates an exemplary IaC cloud deployment flow.

FIG. 6 illustrates an exemplary IaC cloud deployment flow. As shown in FIG. 6, a CSP developer defines infrastructure configuration parameters via IaC templates. The infrastructure configuration parameters include a version control description. Subsequently, the IaC Templates are internally tested for best-practices and compliance requirements before being exposed via a management API and stored on a master server. A cloud customer then uses an IaC template to select one or more parameters to specify a target end-state for configuration of requested infrastructure resources. The IaC template is used for deployment automation via IaC tools (e.g., orchestration and configuration management). Finally, the cloud customer is informed when infrastructure resources are ready for deployment.

As discussed above, CSP providers currently have no mechanism to prevent malicious CSP-backdoors or configuration drifts from the requested infrastructure configuration. According to one embodiment, secure configuration (SConfig) parameters are included in IaC templates as declarative programming (declaratives) to provide configurable security options that, when executed, generates a plurality of menu options that may be selected by cloud users to enable an intent driven secure configuration for CSP-owned infrastructure, as well as provide security for deployed workloads executing in infrastructure resources provided by the CSP. In a further embodiment, a trusted execution environment is provided to validate the user SConfig options and security rules selected from the IaC template prior to deployment of infrastructure resources to ensure that no insecure misconfigurations or CSP backdoors have been created. As defined herein, a workload comprises infrastructure services and resources (e.g., storage, network, compute, etc.) implemented to execute an application. Cloud users may provide their own workload, or may simply provide data that may need to be processed by a CSP provided workload.

Figure 7:
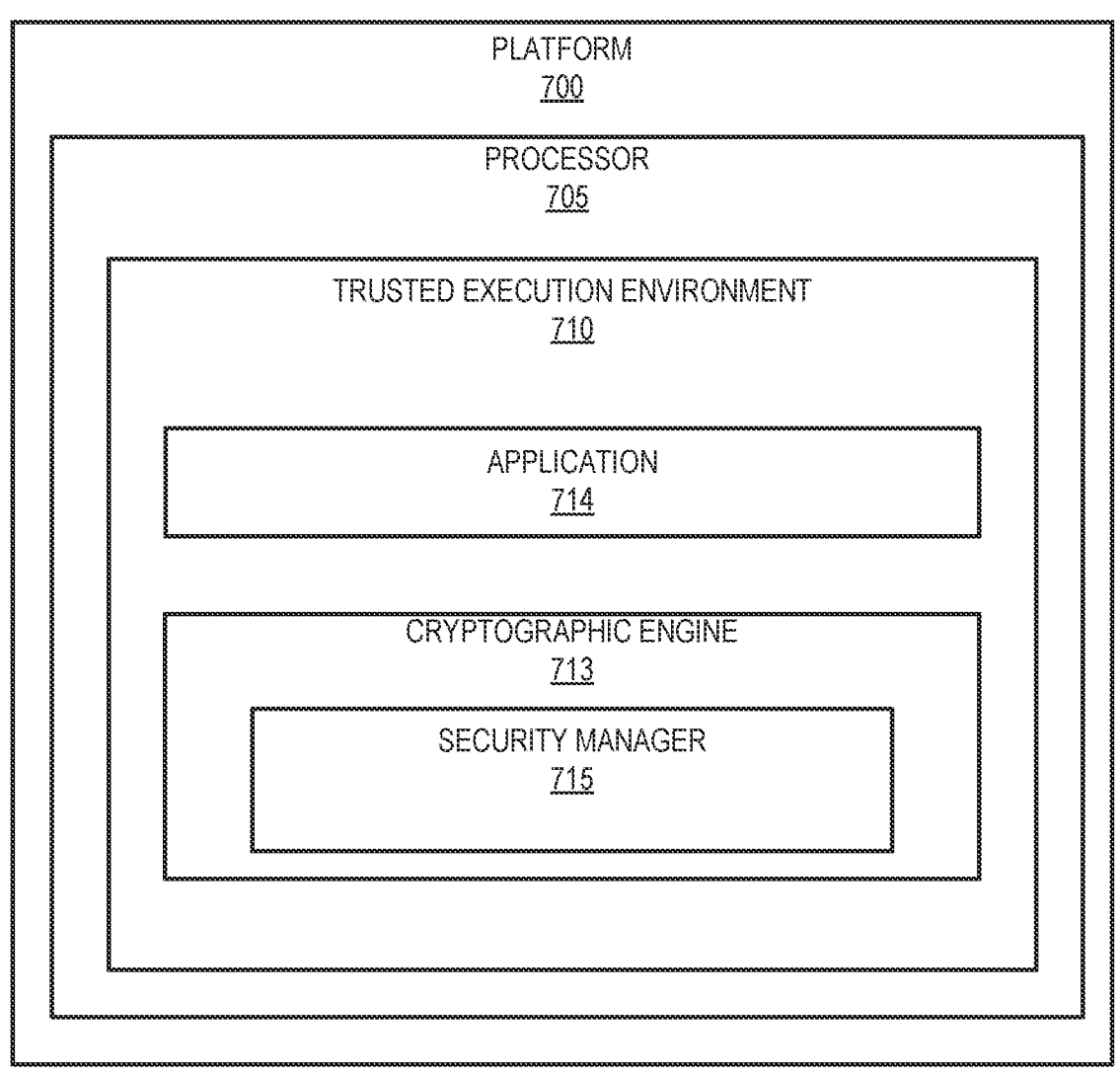
FIG. 7 illustrates one embodiment of a platform.

In a further embodiment, a trusted server 450 (FIG. 4) is provided to the trusted environment to validate the SConfig parameters selected by a user from an IaC template. FIG. 7 illustrates one embodiment of a platform 700 implemented to operate at a trusted server 450. As shown in FIG. 7, the illustrative platform 700 may include a processor 705 to establish a TEE 710 during operation. The platform 700 may be the same as computing device 100 described with respect to FIGS. 1 and 2, and computing device 420 in FIG. 4, for example. The establishment of the TEE 710 may be in line with the discussion above with respect to FIG. 3 of establishing a TEE (also referred to as a secure enclave) and such discussion applies similarly here with respect to FIG. 7.

As illustrated, the TEE 710 further includes an application 714 and a cryptographic engine 713. The various components of the platform 700 may be embodied as hardware, firmware, software, or a combination thereof. As such, in some embodiments, one or more of the components of the platform 700 may be embodied as circuitry or collection of electrical devices (e.g., cryptographic engine circuitry 713). It should be appreciated that, in such embodiments, the cryptographic engine circuitry 713, may form a portion of the processor 705, and/or other components of the computing device 100. Additionally, in some embodiments, one or more of the illustrative components may form a portion of another component and/or one or more of the illustrative components may be independent of one another.

The TEE 710 may be embodied as a trusted execution environment of the platform 700 that is authenticated and protected from unauthorized access using hardware support of the platform 700. Illustratively, the TEE 710 may be embodied as one or more secure enclaves established using Intel™ SGX technology. The TEE 710 may also include or otherwise interface with one or more drivers, libraries, or other components of the platform 700 to interface with an accelerator.

The cryptographic engine 713 is configured to enable protected data transfer between a secure application and networked devices via its components. In implementations here, the cryptographic engine 713 enables protected data transfer between a secure application, such as application 714 operating in TEE 710. In one embodiment, the secure application 714 comprises a validator application implemented to validate that user selected SConfig parameters (or rules) have been satisfied in the provisioned and configured infrastructure resources owned by the CSP. In such an embodiment, application 714 receives security rules associated with the selected SConfig parameters and validates that infrastructure resource configurations provided by a CSP conform to the security rules selected from the IaC SConfig parameters. In a further embodiment, the validation may be performed by determining whether the provided infrastructure resource configurations match rules associated with the selected security options. As used herein, infrastructure resource configuration refers to a combination of infrastructure resources (e.g., servers, racks of FPGAs, GPUs, storage devices, software, VM instances, etc.) implemented to execute a workload.

As mentioned above, a SConfig configuration comprises a parameterized entry included in a machine-readable definition IaC template with descriptive information for runtime debug and error management to allow a IaC cloud user to select from among options to define a security-intent by specifying an expected configuration for requested infrastructure resources and the security rules to identify violating resources. Thus, an IaC template may include conventional parameters used to provide menu options to enable a user to specify infrastructure resources that are being requested and security rules associated with the specified infrastructure resources. The selected security rules are later used by the trusted environment to ensure infrastructure resources provided by the CSP adhere to the security rules by identifying resources that violate the security rules. In embodiments, the SConfig parameters may be defined by a CSP (e.g., a set of industry standard features that CSP can offer or CSP's custom feature-set), or may be options defined by a IaC cloud customer.

In one embodiment, SConfig may be viewed as a contract that is used to establish trust between the CSP and IaC Cloud user. Accordingly, SConfig parameter options may be publicly inspected since they are public and include no confidentiality requirements. In one embodiment, SConfig parameter options include configuration and runtime security parameters to be enabled as intended by a cloud user for a particular cloud deployment.

Sconfig configuration options may include a multi-tenant environment option that indicates whether it is permissible for a user's workload to be included in a multi-tenant environment. Thus, a user may be able to define additional tenant isolation requirements (e.g., confidentiality, integrity and replay of tenant data, etc.) as part of the deployment. Another Sconfig configuration option may also include a choice for workload isolation to indicate a user's preference of hardware enforced isolation and/or implementation of a TEE to execute workloads. Similarly, another Sconfig configuration option may include memory isolation. Yet another configuration option may include a deep clean requirement, which specifies that a clean memory state must be provided (e.g., no data left over from a previously executed workload). Secure boot and attestation may also be a configuration option. This option provides assurances that all software is attested prior to use on a workload. In one embodiment, validation of this parameter involves receive attestation evidence from the CSP.

Runtime SConfig parameters are implemented to ensure that the infrastructure resource security requirements are maintained during the actual workload execution. In one embodiment, platform cryptographic engine 713 includes a security manager 715 to monitor infrastructure resource configurations during execution of a user's workload to determine whether an infrastructure resource configuration provided by the CSP continues to conform with the security rules selected in the IaC template. Thus, security manager 715 ensures that the CSP does not change the resource requirements after the initial configuration (e.g., that contract not violated during execution).

In one embodiment, security manager 715 monitors the infrastructure resource configurations by receiving secure telemetry data from during workload execution. In such an embodiment, security manager 715 compares the telemetry data to the runtime SConfig parameters to confirm that the SConfig parameters are not being violated. Upon a determination that there is a violation, workload execution is stopped, and validation of the SConfig parameters must be performed prior to redeployment of the workload. For example, upon a determination by security manager 715 that attestation changes (e.g., to firmware or software) have occurred during runtime, the attestation needs to be repeated prior to redeployment)

Figure 8:
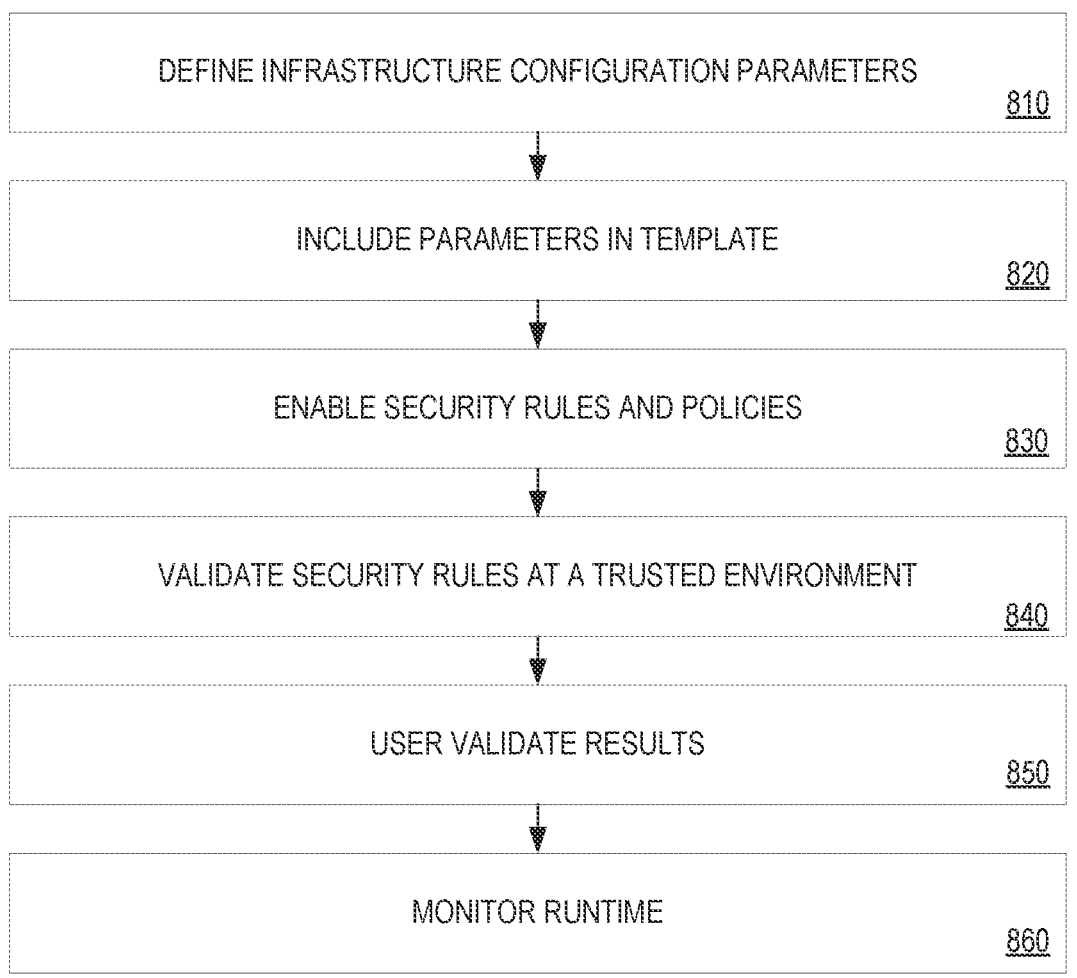
FIG. 8 is a flow diagram illustrating one embodiment of a process for performing an IaC cloud deployment.

FIG. 8 is a flow diagram illustrating one embodiment of a process for performing an IaC cloud deployment. At processing block 810, a CSP developer defines the infrastructure configuration parameters via IaC templates. As discussed above, the CSP developer includes "Sconfig" menu options. In one embodiment, IaC templates are internally tested for best-practices and compliance requirements before being exposed via a Management API and stored on a master server.

At processing block 820, each IaC template is extended to include a user configurable "SConfig" option. At processing block 830, an IaC user enables the security rules and policies using the pre-defined declaratives in the "SConfig" option in the IaC template. At processing block 840, a validation application is executed in a trusted environment (or by a trusted 3rd party) to validate that the selected SConfig options and rules have been satisfied in the provisioned and configured infrastructure resources owned by the CSP. As discussed above, this process involves validating the infrastructure resource configurations against the SConfig parameters/declaratives in the IaC template.

Figure 9:
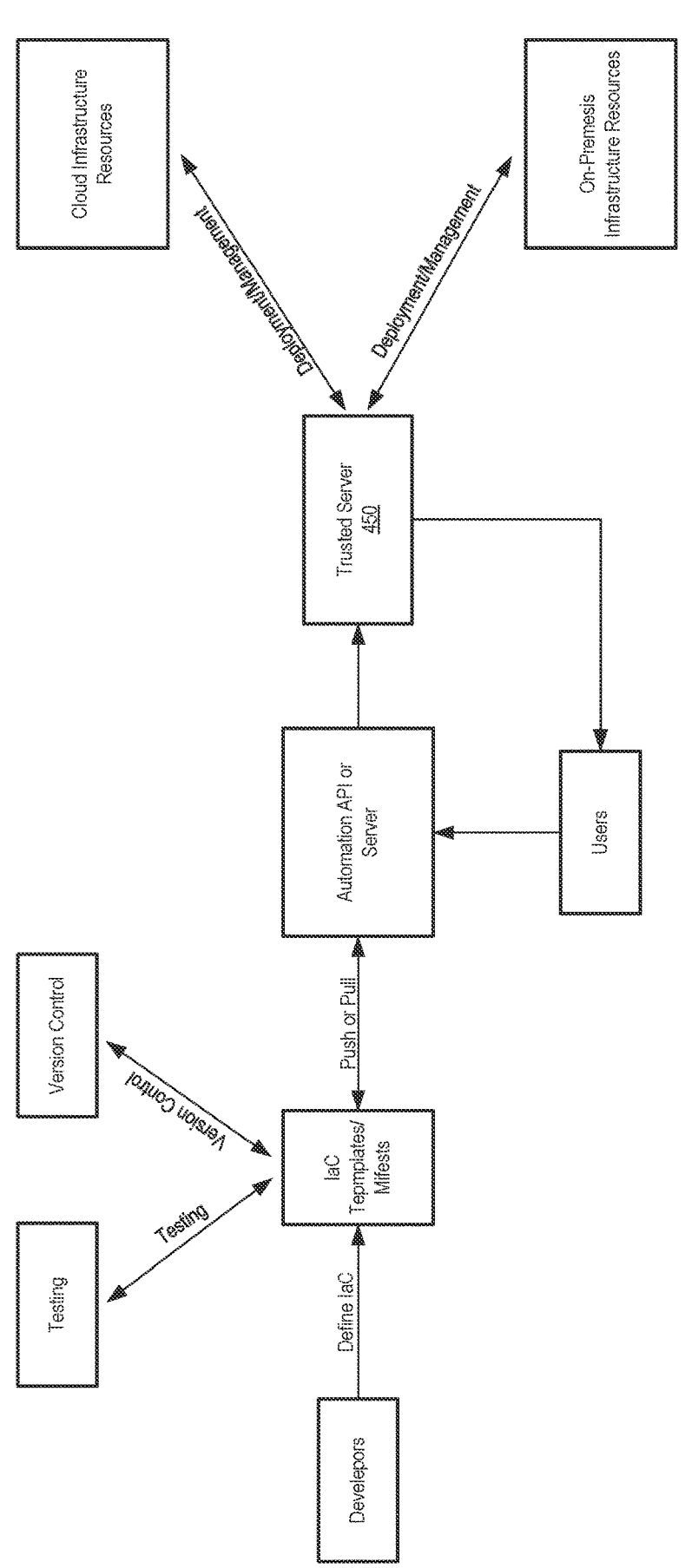
FIG. 9 illustrates one embodiment of a IaC cloud deployment flow.

At processing block 850, the IaC User validates the result of the validation to ensure deployed infrastructure is as intended. At processing block 860, runtime execution of a workload is monitored (e.g., via received secure telemetry data) to confirm that the SConfig parameters are not being violated. FIG. 9 illustrates another embodiment of a IaC cloud deployment flow discussed above.

Illustrative examples of the technologies disclosed herein are provided below. An embodiment of the technologies may include any one or more, and any combination of, the examples described below.

Example 1 includes an apparatus comprising one or more processors to execute a plurality of parameters included in an Infrastructure as Code (IaC) template, wherein the plurality of parameters comprise a first parameter corresponding to a first type to specify an infrastructure resources configuration and a second parameter corresponding to a second parameter type to specify security rules for the infrastructure resources configuration.

Example 2 includes the subject matter of Example 1, wherein the security rules are used to validate that the infrastructure resources configuration adhere to user security requirements.

Example 3 includes the subject matter of any of Examples 1-2, wherein the second parameter type comprises configuration parameter options.

Example 4 includes the subject matter of any of Examples 1-3, wherein a configuration parameter option comprises a multi-tenant environment option that indicates whether it is permissible for a workload to be executed in a multi-tenant environment.

Example 5 includes the subject matter of any of Examples 1-4, wherein a configuration parameter option comprises a secure boot and attestation configuration option to ensure that software is attested prior to use on a workload Example 6 includes the subject matter of any of Examples 1-5, wherein the second parameter type comprises runtime parameter options.

Example 7 includes the subject matter of any of Examples 1-6, wherein the runtime parameter options are implemented to ensure that the infrastructure resource security requirements are maintained during the actual workload execution.

Example 8 includes the subject matter of any of Examples 1-7, wherein a runtime parameter option comprises a defined secure mode of execution.

Example 9 includes an apparatus comprising a processor comprising a trusted execution environment (TEE) to receive one or more security rules selected in an Infrastructure as Code (IaC) template and perform a validation on an infrastructure resource configuration provided by a Cloud Service Provider (CSP) to confirm that the infrastructure resource configuration conforms to the security rules.

Example 10 includes the subject matter of Example 9, wherein the TEE performs the validation prior to execution of a workload.

Example 11 includes the subject matter of any of Examples 9-10, wherein the TEE monitors execution of the workload to determine whether the infrastructure resource configuration continues to conform with the security rules selected in the IaC template.

Example 12 includes the subject matter of any of Examples 9-11, wherein the TEE monitors execution of the workload by receiving telemetry data from the infrastructure resources during execution of the workload.

Example 13 includes the subject matter of any of Examples 9-12, wherein the TEE stops the execution of the workload upon determining that the infrastructure resource configuration does not conform with the security rules selected.

Example 14 includes the subject matter of any of Examples 9-13, wherein the TEE performs a second validation upon stopping the execution of the workload.

Example 15 includes a method comprising receiving one or more security rules selected in an Infrastructure as Code (IaC) template at a trusted execution environment (TEE) and performing a validation on an infrastructure resource configuration provided by a Cloud Service Provider (CSP) to confirm that the infrastructure resource configuration conforms to the security rules prior to execution of a workload.

Example 16 includes the subject matter of Example 15, further comprising monitoring execution of the workload to determine whether the infrastructure resource configuration continues to conform with the security rules selected in the IaC template.

Example 17 includes the subject matter of any of Examples 15-16, wherein monitoring the execution of the workload comprises receiving telemetry data from the infrastructure resources during the execution of the workload.

Example 18 includes the subject matter of any of Examples 15-17, further comprising stopping the execution of the workload upon determining that the infrastructure resource configuration does not conform with the security rules and performing a second validation.

Example 19 includes at least one computer readable medium having instructions stored thereon, which when executed by one or more processors, cause the processors to receive one or more security rules selected in an Infrastructure as Code (IaC) template at a trusted execution environment (TEE) and perform a validation on an infrastructure resource configuration provided by a Cloud Service Provider (CSP) to confirm that the infrastructure resource configuration conforms to the security rules prior to execution of a workload.

Example 20 includes the subject matter of Example 19, having instructions stored thereon, which when executed by one or more processors, further cause the processors to monitor execution of the workload to determine whether the infrastructure resource configuration continues to conform with the security rules selected in the IaC template.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition, "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
processing circuitry coupled to a memory, the processing circuitry to:

execute one or more parameters associated with a template, wherein the one or more parameters comprise one or more of a first parameter corresponding to a first parameter type to specify an infrastructure resources configuration or a second parameter corresponding to a second parameter type relating to one or more configuration parameter options to specify security rules associated with the infrastructure resources configuration, wherein the one or more configuration parameter options further include a second configuration parameter option comprising a secure boot and attestation configuration option to ensure that software is attested prior to use on the workload.

2. The apparatus of claim 1, wherein the template comprises an Infrastructure as Code (IaC) template, wherein the security rules to validate that the infrastructure resources configuration adhere to one or more security protocols.

3. The apparatus of claim 1, wherein the one or more configuration parameter options include a first configuration parameter option comprising a multi-tenant environment option that indicates whether it is permissible for a workload to be executed in the multi-tenant environment.

4. The apparatus of claim 3, wherein the second parameter type further relates to one or more runtime parameter options.

5. The apparatus of claim 4, wherein the one or more runtime parameter options are implemented to ensure that the one or more security protocols are maintained during workload execution, wherein a runtime parameter option comprises a defined secure mode of execution.

6. The apparatus of claim 1, wherein the processing circuitry comprises one or more of application processing circuitry or graphics processing circuitry.

7. A method comprising:
executing, by a computing device, one or more parameters associated with a template, wherein the one or more parameters comprise one or more of a first parameter corresponding to a first parameter type to specify an infrastructure resources configuration or a second parameter corresponding to a second parameter type relating to one or more configuration parameter options to specify security rules associated with the infrastructure resources configuration, wherein the one or more configuration parameter options further include a second configuration parameter option comprising a secure boot and attestation configuration option to ensure that software is attested prior to use on the workload.

8. The method of claim 7, wherein the template comprises an Infrastructure as Code (IaC) template, wherein the security rules to validate that the infrastructure resources configuration adhere to one or more security protocols.

9. The method of claim 7, wherein the one or more configuration parameter options include a first configuration parameter option comprising a multi-tenant environment option that indicates whether it is permissible for a workload to be executed in a multi-tenant environment.

10. The method of claim 9, wherein the second parameter type further relates to one or more runtime parameter options.

11. The method of claim 10, wherein the one or more runtime parameter options are implemented to ensure that the one or more security protocols are maintained during workload execution, wherein a runtime parameter option comprises a defined secure mode of execution.

12. The method of claim 7, wherein the computing device comprises processing circuitry having one or more of application processing circuitry or graphics processing circuitry.

13. At least one computer-readable medium having stored thereon instructions which, when executed, cause a computing device to perform operations comprising:

executing one or more parameters associated with a template, wherein the one or more parameters comprise one or more of a first parameter corresponding to a first parameter type to specify an infrastructure resources configuration or a second parameter corresponding to a second parameter type relating to one or more configuration parameter options to specify security rules associated with the infrastructure resources configuration, wherein the one or more configuration parameter options further include a second configuration parameter option comprising a secure boot and attestation configuration option to ensure that software is attested prior to use on the workload.

14. The computer-readable medium of claim 13, wherein the template comprises an Infrastructure as Code (IaC) template, wherein the security rules to validate that the infrastructure resources configuration adhere to one or more security protocols.

15. The computer-readable medium of claim 13, wherein the one or more configuration parameter options include a first configuration parameter option comprising a multi-tenant environment option that indicates whether it is permissible for a workload to be executed in a multi-tenant environment.

16. The computer-readable medium of claim 13, wherein the second parameter type further relates to one or more runtime parameter options.

17. The computer-readable medium of claim 16, wherein the one or more runtime parameter options are implemented to ensure that the one or more security protocols are maintained during workload execution, wherein a runtime parameter option comprises a defined secure mode of execution, wherein the computing device comprises processing circuitry having one or more of application processing circuitry or graphics processing circuitry.

* * * * *